UNITED STATES PATENT OFFICE.

ELMER A. SPERRY, OF BROOKLYN, NEW YORK.

PROCESS OF PREPARING PURE TIN COMPOUNDS.

No. 887,538.      Specification of Letters Patent.      Patented May 12, 1908.

Application filed April 27, 1907. Serial No. 370,681.

*To all whom it may concern:*

Be it known that I, ELMER A. SPERRY, a citizen of the United States, residing at Brooklyn, in the county of Kings and State of New York, have invented new and useful Improvements in Processes of Preparing Pure Tin Compounds, of which the following is a specification.

My invention relates to the commercial production of compounds of tin of great purity. These compounds may be either liquid or solid. Among these products may be mentioned the "bichlorid" of commerce, which is a solution of stannic chlorid; "butter of tin" of commerce, which is a hydrated form of stannic chlorid with definite water of crystallization; tin crystals—stannous chlorid; "pink salts", tin oxyhydrate; tin oxid, and the like.

The invention consists in first converting the metallic tin in the tin bearing material into an anhydrous compound preferably one with a halogen base, for instance, anhydrous tetrachlorid, which it is found will not combine with ordinary foreign materials, as do solutions, especially stannic solutions. The method of preparation preferably being such that the reaction is under temperature control at all times and wherein the foreign bodies and substances contained in the tin bearing material are found in and commingled with the anhydrous tin compound so produced. While in the anhydrous form, the material may thus be more easily purified and freed, for instance, from iron, or other foreign substances which may be present in the cheaper forms of tin, or tin bearing material: for instance, the anhydrous stannic chlorid may be readily distilled or otherwise suitably rendered pure, it being practical to render this substance perfectly pure, thus eliminating entirely the foreign materials including gaseous impurity, such as chlorin where present.

The intermediate product, viz: the anhydrous liquid may be considered as the base from which the various terminal products are derived by a treatment suitable to each. During the preliminary step of converting the tin into the anhydrous liquid, it will be found most advantageous to proceed under conditions of temperature control. A single instance will serve to illustrate the general procedure: the preparation of C. P. oxid of tin from impure tin or "hard head". Anhydrous chlorid is first prepared by introducing chlorin into anhydrous chlorid which contains the tin bearing material, preferably pulverulent. The mass of chlorid, after being augmented from the metallic tin content of the "hard head" is then freed from foreign materials, as by simple filtration and then distilling if necessary and later if chlorin is still found present, this is suitably removed as by agitation in the presence of pure tin or by distillation or both. The purified anhydrous chlorid is then treated with distilled water by preferably adding the former to the latter to a point of about twenty-five degrees B. To this solution, preferably while still hot, is added a suitable alkali, for instance, milk of lime in its pure state, until the whole mass is perfectly neutral or brought to the requisite conditions, whereupon the oxyhydrate of tin is precipitated and separated from the solution by filtration, and perfectly dried, if this is to be the final product; but if the pure oxid is required, free from the combined water, the hydrated oxid is "ignited" or furnaced appropriately, yielding a heavy white, highly pulverulent product of surpassing brilliancy.

The above instance serves to illustrate the importance of the purifying step of the process.

The process as a whole is thus seen to serve at least two useful purposes, viz: the preparation of pure tin compounds from impure tin or tin-bearing material, thus effecting an important saving in the first cost of the tin and furthermore to produce a product from this source of great intrinsic purity. It is of course to be understood that the steps may be varied to suit the special terminal product required, so long as such steps fall properly within the scope of the invention.

I claim:

1. The process of preparing pure tin compounds from tin bearing material, which consists in treating the tin bearing material with a halogen reagent, maintained below the boiling point of anhydrous stannic chlorid, producing thereby a liquid anhydrous tin compound, containing foreign substances, distilling the liquid so produced and thus separating the anhydrous tin compound from the foreign gases and solids and obtaining it practically pure while still in the anhydrous state.

2. The process of preparing pure tin compounds from tin bearing material, which consists in treating the tin bearing material with a halogen reagent, producing thereby a liquid anhydrous tin compound containing foreign substance, distilling the liquid, thus separating the anhydrous tin compound from the foreign substance and obtaining it practically pure while still in the anhydrous state and adding a diluent to the distillate.

3. The process of preparing pure tin compounds from tin bearing material which consists in treating the tin bearing material with a halogen reagent, producing thereby a liquid anhydrous tin compound containing foreign substance, distilling the liquid and thus separating the anhydrous tin compound from the foreign substance and obtaining it practically pure while still in the anhydrous state and adding water as a diluent to the distillate.

In testimony whereof I have hereunto set my hand in presence of two subscribing witnesses.

ELMER A. SPERRY.

Witnesses:
ALFRED L. GRIFFITH,
A. R. GIBBS.